United States Patent [19]
Paige

[11] 4,243,348
[45] Jan. 6, 1981

[54] TOOL HOLDER

[76] Inventor: Earle J. Paige, 1030 Blue Horizon Dr., Deltona, Fla. 32725

[21] Appl. No.: 65,264

[22] Filed: Aug. 9, 1979

[51] Int. Cl.³ .................. B23B 51/00; B26D 1/12; B23B 31/10
[52] U.S. Cl. .................... 408/186; 408/187; 408/239 R; 407/54; 407/61; 407/107
[58] Field of Search ............. 408/186, 187, 188, 189, 408/190, 191, 199, 223, 224, 225, 228, 229, 230, 231, 232, 238, 239, 240; 407/40, 41, 42, 54, 61, 107

[56] References Cited
U.S. PATENT DOCUMENTS

| 1,219,097 | 3/1917 | Gibbs | 407/107 X |
| 1,387,343 | 8/1921 | Betz | 407/61 X |
| 2,908,963 | 10/1959 | Gollus | 407/107 |
| 3,545,061 | 12/1970 | Michael | 407/90 |
| 3,688,367 | 9/1972 | Bennett | 407/54 X |
| 3,704,497 | 12/1972 | Derwin | 407/107 |
| 4,097,181 | 6/1978 | Fisher | 408/187 |

Primary Examiner—Harrison L. Hinson

[57] ABSTRACT

A holder for a rotary metal cutter for use with a milling machine having a shouldered head portion, a cutter and a clamp member. The cutter is sandwiched between the clamp member and the shoulder of the head portion. Where it is desired that the cutter be adjustable on a horizontal plane, a variation of the holder is provided, which includes a clamp element cooperating with a clamp member to permit the required rotation and to assure a secure clamp on the cutter after adjustment. Variations of the holder are included for engaging two cutters set on opposite sides of the holder.

7 Claims, 20 Drawing Figures

2

TOOL HOLDER

BACKGROUND OF THE INVENTION

This invention relates to metal cutting tools and more specifically to a rotary cutter of the inserted-tooth type.

Cutters of the inserted-tooth type have a machinery steel body into which high-speed tool steel teeth are inserted. The teeth fit into slots and are held in place by flat sided bushings which are forced against the teeth. The bushings are held in place by screws which do not pass through the teeth.

Milling machines are used for a great variety of operations, although they were originally developed for manufacturing the small irregular parts used in the construction of firearms.

In the present state of the art, rotary cutters are utilized for milling flat surfaces, grooves, chamfers, or arcuate surfaces.

The U.S. patent to Fisher, U.S. Pat. No. 4,097,181, issued June 27, 1978, discloses a contemprorary rotary cutting tool which utilizes a head having a flat bed portion on which a clamp member engages a bit which in turn holds a cutter. The clamp is circular in configuration and is held in engagement by a single, vertical axially positioned screw. This tool does not utilize the shoulder of the head nor does it utilize a two point engagement to assure that the clamp will not move during cutting operations, nor does it directly clamp the cutter.

SUMMARY OF THE INVENTION

This invention is directed at a rotary metal cutting tool in which the one-piece cutter is held engaged to the head by a clamp member, in which the clamp member and cutter bear against shoulders formed in the head, and by a pair of spaced screws engaged through the clamp member.

This invention is also directed at a rotary metal cutting tool having a head with a shoulder portion formed on each side of the head. Each shoulder portion engages a cutter which is held in place by a clamp member including a pair of spaced screws.

This invention is further directed at a rotary metal cutting tool having a head with a shoulder portion formed on each side. Each shoulder portion has a slot opening into the shoulder portion. The cutter includes an arcuate wall which conforms to the configuration of the wall of the shoulder portion and the clamping means is of two-piece construction, one of which has a single vertical centrally engaged screw which permits the cutter to be moved around its axis and the other piece (clamp element) fits into the slot and holds the cutter against movement after it has been positioned.

The invention contemplates the use of two screws and at least one wall of the shoulder portion to hold the cutter against movement.

The cutters are constructed to permit sharpening by grinding a pair of spaced, parallel flats or faces thereby only slightly changing the distance between the cutting edge and the through opening.

The cutting edges may be formed in various configurations.

DESCRIPTION OF THE PREFERRED EMBODIMENTS

Further details are explained below with the help of the examples illustrated in the attached drawings in which.

Figure 1:
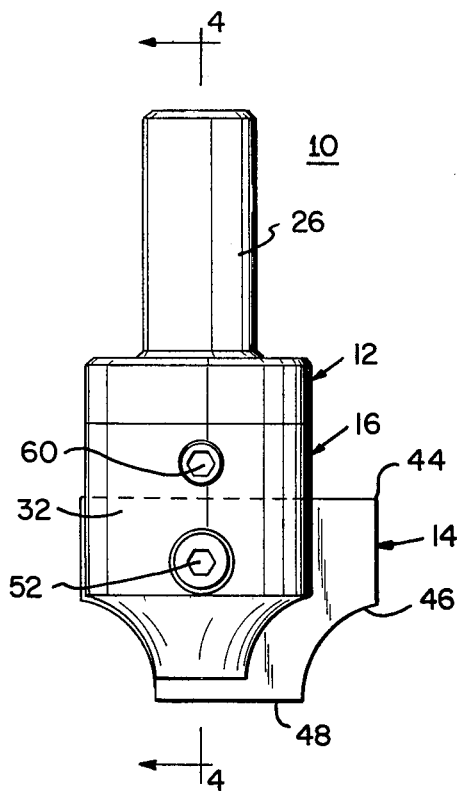
FIG. 1 is a front elevational view of the tool holder according to the present invention utilizing a single cutter.
Figure 2:
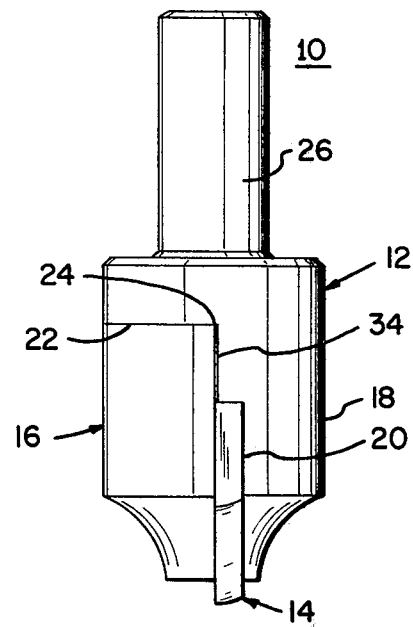
FIG. 2 is a side elevational view of the tool holder shown in FIG. 1.
Figure 3:
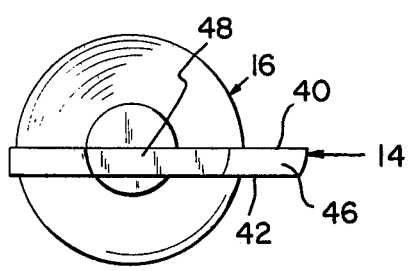
FIG. 3 is a bottom plan view of the tool holder shown in FIG. 1.

There is shown in the drawings, particularly at FIGS. 1-4, a tool holder 10 including a head 12, a cutter or cutter blade 14 and a clamp member 16 for use with a machine tool, a milling machine, for example. The head 12 is formed of a shoulder portion 18 having a flat, horizontal bed surface 20 and a first wall 22 integral with and in right angle relation to the banking or bed surface 20. A shelf portion 24 is integral with the bed surface 20, is rectangular in configuration, has an upper surface located on a horizontal plane spaced from the plane of the bed surface 20 and is integral with the first wall 22. The first wall 22 is of semi-circular, disk-like configuration having its external surface merging into the external surface of the shoulder portion 18 to provide a wall parallel with the first wall 22 from the center of which an integral cylindrical engagement portion 26 extends in a direction away from the shoulder portion 18. An internally shouldered, tapped, first aperture 28 is formed through and bed surface 20 and a tapped second aperture 30 is formed through the shelf portion 24 and is of smaller diameter than the first aperture 28. Both the first and second apertures 28, 30 are located on the midline of the shoulder portion 18.

The clamp member 16 comprises a generally semicircular body portion 32 having a substantially planar face 34 and an end wall 35 in right angle relation to the face 34. The face 34 has a shallow, rectangular indentation formed transversely therein including an internally shouldered first hole 36 provided on the midline of the face 34. A through second hole 38 is formed in face 34 and is spaced from and in line with the first hole 36. The second hole 38 is positioned closer to the end wall 35 than the first hole 36.

The unitary cutter 14 comprises a base which has a first flat 40 and a second flat 42, the second flat 42 in spaced parallel relation to the first flat 40. An edge wall 44 is in right angle relation to and joins the first and second flats 40, 42 at a side of the base. A cutting edge 46 is formed on a side wall 48 of the base and is in angular relation to and spaced from the edge wall 44. In the embodiment shown in FIGS. 1–4, the cutting edge 46 is concave on a plane parallel to the horizontal planes of the first and second flats 40, 42, is slightly convex in transverse relation to the horizontal plane of the base, and is angled back and is slightly convex from the first flat 40 to the second flat 42.

An opening 50 is formed through the base and the first and second flats 40, 42. The opening 50 is located further from the side wall 48 than from the opposite parallel edge wall 44 of the base for a purpose to be described hereinafter.

Figure 4:
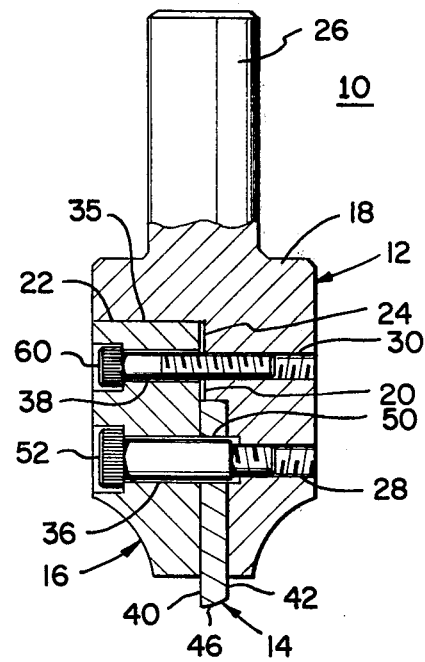
FIG. 4 is a section on ine 4—4 of FIG. 1.

The tool holder 10 is assembled by positioning the second flat 42 of the cutter 14 in superposed abutting relation to bed surface 20 of the shoulder portion 18, locating the edge wall 44 in bearing relation to the side wall of the shelf portion 24 and having the opening 50 of the cutter 14 in axial alignment with the first aperture 28 of the shoulder portion 18. The height of the cutter 14 is greater than the height of the shelf portion 24 positioning the horizontal plane of the first flat 40 above the plane of the upper surface of the shelf 24 on the plane of the center line of the head 12 or slightly above it. This positions the cutting edge 46 on the horizontal plane of the center line of the head 12. The side of the cutter 14 including the cutting edge 46 extends beyond the area of the shoulder portion 18. The face 34 of the clamp member 16 is positioned in abutting, superposed relation to the first flat 40 of the cutter 14 and in spaced, superposed relation to the upper surface of the shelf portion 24 with the end wall 35 of the clamp member 16 bearing against the first wall 22 of the shoulder portion 18. The first through hole 36 of the clamp member 16 is positioned in axial alignment with the through opening 50 of the cutter 14 and the secong hole 38 of the clamp member 16 is positioned in axial alignment with the second aperture 30 of the shoulder portion 18. A first screw 52 having a head and a shouldered shank, including an upper unthreaded portion and a lower threaded portion, is passed through the first hole 36 of the clamp member 16, the opening 50 in the cutter 14 and is screwed into engagement with the internal screw threads of the first aperture 28. When securely screwed in position, with the head of the first screw 52 bearing against the clamp member 16, the shoulder of the first screw 52 is in proximate spaced relation to the internal shoulder of the first aperture 28. The upper unthreaded portion of the first screw 52 is in slipped engagement with a portion of the first aperture 28 as shown in FIG. 4. A headed second screw 60 is passed through the second hole 38 of the clamp member 16 and engaged with the internal threads of the second aperture 30 of the shoulder portion 18. The engagement portion 26 is engaged, in a manner well known in the art, with a milling machine (not shown).

Figure 8:
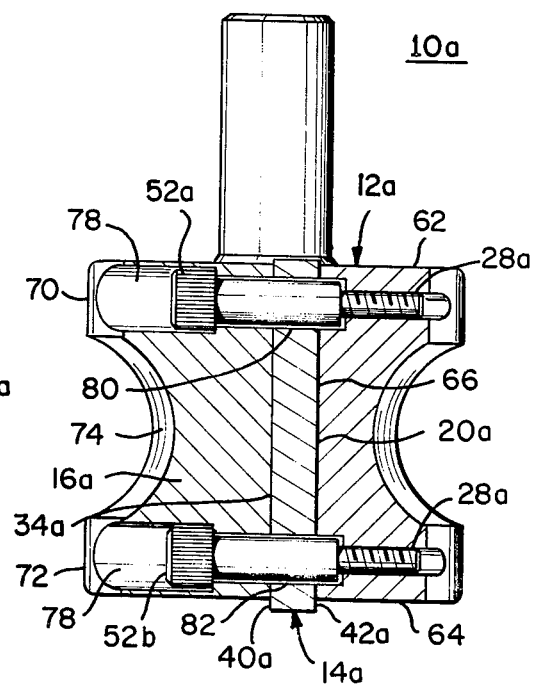
FIG. 8 is a section on line 8—8 of FIG. 5.
Figure 9:
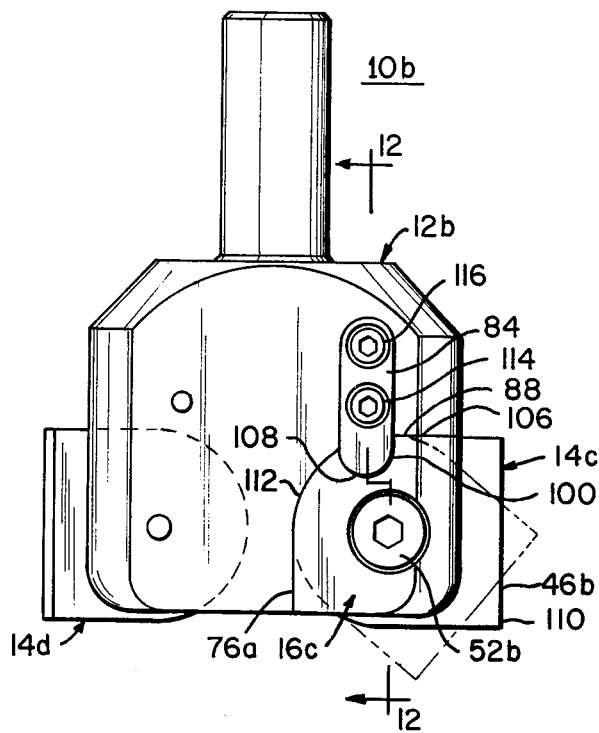
FIG. 9 is a front elevational view of a second variation of the tool holder shown in FIG. 1 utilizing two spaced cutters that may be positioned through a horizontal arc.
Figure 10:
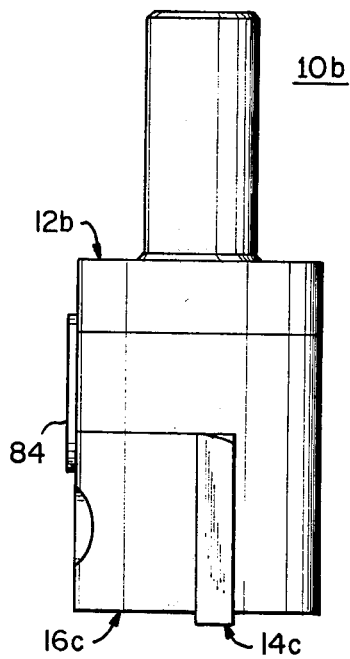
FIG. 10 is a side elevational view of the tool holder shown in FIG. 9.

There is shown in the drawings at FIGS. 5–8 a first variation 10a of the tool holder 10 shown in FIGS. 1–4. The first variation 10a comprises a head 12a, a generally rectangular first cutter 14a, and a second cutter 14b and a first clamp member 16a and a second clamp member 16b. The head 12a comprises a first integral shoulder portion 18a which includes a first extension 62 and an integral second extension 64 which is spaced from a part of the first extension 62 by a concave opening and joined to a part of the first extension 62 by an integral shelf portion 66. The upper surface of the first and second extension 62, 64 and the upper surface of the shelf portion 66 provides a substantially continuous first bed surface face 20a which lies on a horizontal plane in integral, right angle relation to a wall portion 68 completing the first shoulder portion 18a. A tapped aperture 28a is formed through each extension 62, 64 as shown in FIG. 8. A second integral shoulder portion 18b is formed on the opposite side of the wall portion 68 and includes a second portion 20b similar in configuration to the first bed portion 20, extends away from the wall portion 68 in a direction opposite to that of the first bed portion 20a, and the first and second bed portions 20a, 20b face the same horizontal plane.

The first clamp member 16a comprises a first wing portion 70 connected to a second wing portion 72 by an integral attachment portion 74 having a general concave upper external surface. The lower surface of the first and second wing portions 70, 72 and of the attachment portion 74 lie on the same horizontal plane providing a face 34a. The face 34a is in integral right angle relation with a rear wall 76. Each of the wings 70, 72 has an arced upper surface extending from the rear wall 76 to the face 34a and has a through aperture 78 formed down through the upper surface and the face 34a.

A second clamp member 16b is similar in construction to the first clamp member 16a.

Figure 5:
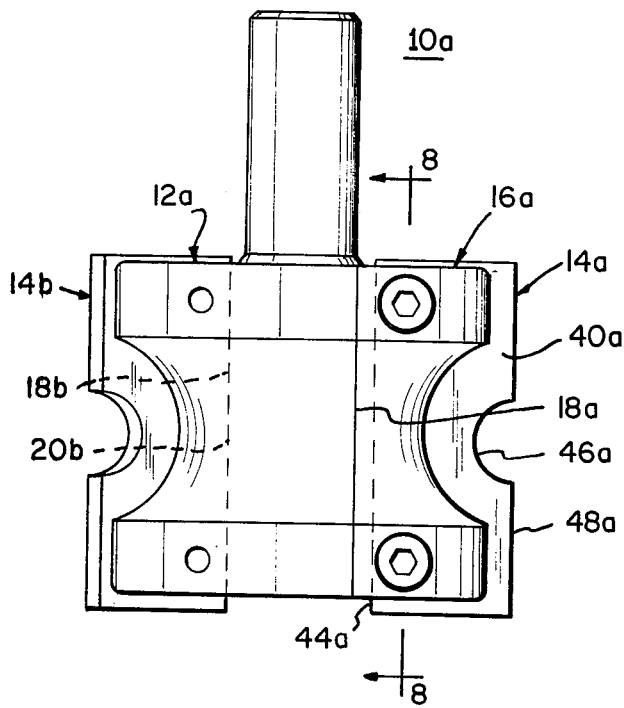
FIG. 5 is a front elevational view of a variation of the tool holder shown of FIG. 1 utilizing two spaced cutters.
Figure 6:
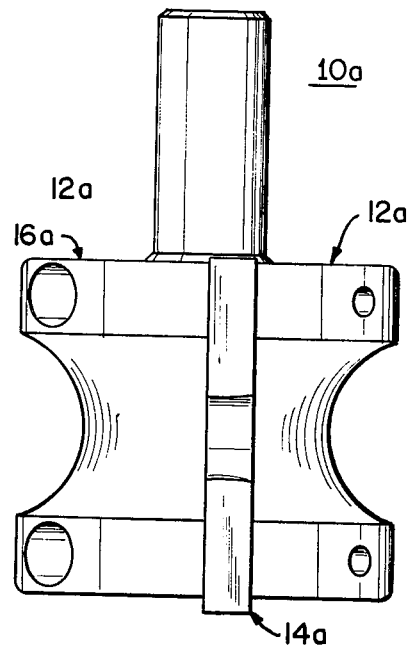
FIG. 6 is a side elevational view of the tool holder shown in FIG. 5.
Figure 7:
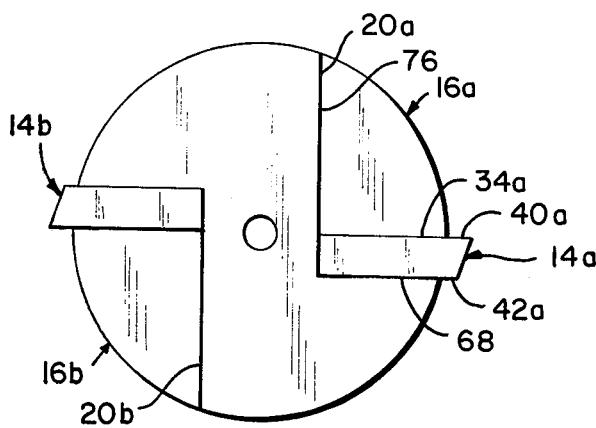
FIG. 7 is a bottom plan view of the tool holder shown in FIG. 5.

The first cutter 14a comprises a body portion having a first flat 40a and a second flat 42a in parallel relation to the first flat 40a. An edge wall 44a is in integral right angle relation to both the first and second flats 40a, 42a joining them together at a side of the base. A cutting edge 46a is generally formed in a side wall 48a of the base. The side wall 48a forms the opposite long side of the base from the edge wall 44a. The cutting edge 46a has a substantially concave configuration on a plane parallel to the horizontal planes of the first and second flats 40a, 42a and is angled inwardly from the horizontal plane of the first flat 40a to the second flat 42a. A first through opening 80 is formed through the base from the first flat 40a through the second flat 42a in close proximity to a corner and to the edge wall 44a and a second opening 82 is formed in the opposite corner of the first cutter 14a in close proximity to the edge wall 44a. The width of the first cutter 14a is greater than the distance between the wall portion 68 and the end of the first and second extensions 62, 64 as shown in FIG. 5.

The tool holder first variation 10a is assembled by positioning the second flat 42a of the first cutter 14a in superposed abutting relation with the first bed surface 20a of the first shoulder portion 18a locating the edge wall 44a in bearing parallel relation to the wall portion 18a with the first opening 80 in axial alignment with an aperture 28a and the second opening in axial alignment with the other aperture 28a. In this position the cutting edge 46a faces away from the wall portion 68 and extends beyond the area defined by the first shoulder portion 18a. The face 34a of the first clamp member 16a is positioned in abutting, superposed relation to the first flat 40a of the situated first cutter 14a, and the rear wall 76 of the first clamp member 16a bears against and is in parallel relation to the wall portion 68 of the first shoulder portion 18a.

The first clamp member 16a is placed so that one of the through apertures 78 is in axial alignment with the first opening 80 of the first cutter 14a and the other aperture 78 is in axial alignment with the second opening 82. A first screw 52a having a head and shouldered shank, including an upper unthreaded portion and a lower threaded portion, is engaged through aperture 78 formed in the first clamp member 16a then through the first opening 80 of the first cutter 14a and screwed into engagement with the internal screw threads of an aperture 28a of the first shoulder portion 18a with the shoulder of the first screw 52a in proximate spaced relation to the internal shoulder of the aperture 78 and the upper unthreaded portion of the first screw 52a, is slip engaged with a portion of the aperture 28a as shown in FIG. 8, and a second screw 52b, similar in construction to the first screw 52a, is engaged through the other aperture 78, through the second opening 82 and then screw engaged in a manner similar to the first screw 52a, with the internal screw threads of the other aperture 78. The first and second screws 52a, 52b are screwed tightly, securely holding the sandwiched first cutter 14a. The second cutter 14b is held in the same way as the first cutter 14a through use of the second shoulder portion and the second clamp member 16b.

There is shown in the drawing at FIGS. 9–12 a second variation 10b of the tool holder 10 shown in FIGS. 1–4. The second variation 10b comprises a head 12b, a first variant cutter 14c, a second variant cutter 14d, a first variant clamp member 16c, a second variant clamp member 16d, a first clamp element 84, and a second clamp element 86.

Figure 11:
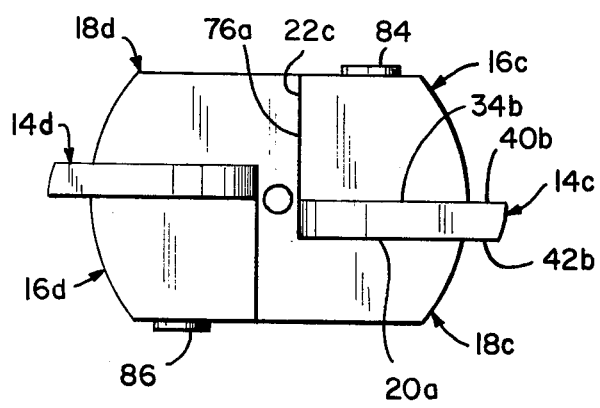
FIG. 11 is a bottom plan view of the tool holder shown in FIG. 9.

The head 12b includes an integral first variant shoulder portion 18c formed on one side of the head 12b and a second variant shoulder portion 18d which is formed on the opposite side of the head 12b as indicated in FIG. 11. The first variant shoulder portion comprises a flat horizontal first bed surface 20c, and an integral first wall 22c, which merges, through an arced surface, into a first side wall 88. Both the first wall 22c and the side wall 88 are in right angle relation to the first bed surface 20c, and the surface of the side wall 88 is in angular relation to the first wall 22c. An elongated slot 90 is formed through the side wall 88 and has its long axis on a plane spaced from and parallel to the plane of the surface of the first wall 22c. The slot 90 includes a floor portion 92 whole horizontal surface plane is spaced above and parallel to the horizontal plane of the first bed surface 20c. The floor portion 92 has an internally threaded, closed, tubular channel 94 formed in close proximity to the opening 96 formed by the slot 90. The long axis of the channel 94 is on a plane at right angles to the extended plane of the first bed surface 20c and on the midline of the floor portion 92. A guide hole 98 is provided on the floor portion 92 spaced from and aligned, on the midline, with the channel 94. An internally shouldered and threaded aperture 28b is formed through the first bed surface 20c.

The first clamp element 84 has a generally ellipsoidal configuration with upper and lower surfaces and an arced front edge 100 and rear edge. A tubular, internally shouldered, through first passage 102 is formed from the upper to the lower surface of the first clamp element 84, on the long midline of the upper surface and in closer proximity to the front edge 102 than the rear edge. A tubular, through second passage 104 is formed from the upper to the lower surface of the first clamp element 84 in alignment with and spaced from the first passage 102 and in close proximity to the rear edge.

Figure 12:
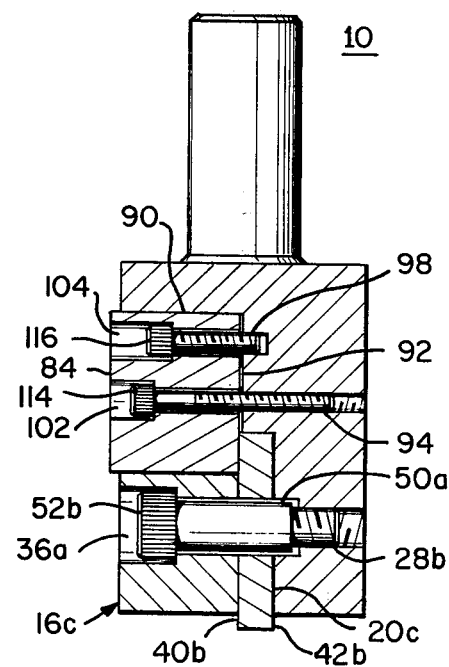
FIG. 12 is a section taken on line 12—12 of FIG. 9.

The first variant clamp member 106 includes an irregularly shaped body portion having a substantially planar face 34b. The face 34b is in integral, right angle relation with an arced rear wall 76a and an arced side wall 106. The arced side wall 106 is in right angle relation to the rear wall 76a and has a concve notch 108 formed therein. The notch 108 extends from the upper surface to the face 34b of the first variant clamp member 16c. An internally shouldered hole 36a is provided in the first variant clamp member 16c extending from the upper face to the face 34b as shown in FIG. 12.

The first variant cutter 14c includes a body portion having a first flat 40b and a second flat 42b in parallel relation to the first flat 40b. The body portion of the first variant cutter 14c also includes a side edge wall 110, a cutting edge 46b and a rear edge wall 112. The rear edge wall is arcuate in configuration, joins the first and second flats 40b, 40b together at an edge of the first variant cutter 14c and merges into the side edge wall 110. The side edge wall 110 is in right angle relation to the flats 40b, 42b and is on the same horizontal plane and in right angle relation to the cutting edge 46b.

The cutting edge 46b is slightly convex on a plane transverse to the horizontal planes of the first and second flats 40b, 42b and is biased inwardly from the first flat 40b to the second flat 42b.

A through opening 50a is positioned to pass through the first and second flats 40b, 42b and has its axis in right angle relation to the horizontal plane of the first and second flats 50b, 42b.

The second variation 10b is assembled by placing the second flat 42b of the first variant cutter 14c in superposed, abutting relation to the first bed surface 20c of the first variant shoulder portion 18c, locating the side edge wall of the first variant cutter 14c in close proximity to the side wall 88 of the first variant shoulder portion 18c and the rear edge wall 112 in bearing relation to the first wall 22c. The first clamp element 84 is inserted into the slot 90 with its bottom surface resting in close proximity to the floor portion 92, the first passage 102 axially aligned with the channel 94, the second passage 104 axially aligned with the guide hole 98, and the lower surface of the first clamp element 84 adjacent the front edge 100 in superposed, abutting relation with a portion of the first flat 40b adjacent the side edge wall 110.

The cutting edge 46b is thus positioned beyond the area defined by the head 12b due to the fact that the length of the first variant cutter 14c is greater than the width of the first bed surface 20c. The first variant clamp member 16c is now located on top of the first variant cutter 16c whereby the face 34b is in superposed abutting relation to the first flat 40b, the notch 108 circumscribes in abutting relation the arced front edge of the first clamp element 84 and the rear wall 76a bears against the first wall 22c of the first variant shoulder portion 18c. In this position, the hole 36a of the first variant clamp member 16c is axially aligned with the aperture 28b of the first bed surface 20c and with the opening 50a of the first variant cutter 14c. A first screw 52b having a head and shouldered shank, including an upper unthreaded portion and a lower threaded portion, is passed through the hole 36a of the first variant clamp member 16c, the opening 50a of the first variant cutter 14c and threaded into the aperture 28b of the first bed surface 20c, with the shoulder of the first screw 52b in proximate spaced relation to the internal shoulder of the aperture 28b and the upper unthreaded portion of the first screw 52b is slip engaged with a portion of the aperture 28b as shown in FIG. 12. At this time, the first variant cutter 14c may be rotated about the first screw 52b varying the angle formed by the long axis of the head 12b and the cutting edge 46b. After the cutting edge 46b is in the required position, a long screw 114 is passed through the first passage 102 of the first clamp element 84 and threaded into engagement with the channel 94 formed in the floor portion 92 of the slot 90. This engagement sandwiches the first variant cutter 14c between the first clamp element 84 and the first bed surface 20c of the first variant shoulder portion 18c fixing the first variant cutter 14c in position. A guide screw 116 is threaded into engagement with the second passage 104 with its free terminal and extending into and bearing against the bottom of the guide hole 98. The horizontal plane of the first flat 40b is positioned on or slightly above the plane of the center line of the head 12b.

The second variant cutter 14d is similar, in configuration and construction, to the first variant cutter 14d and is held in assembly with the second variation head 10b through the use of a second variant clamp member 16d, a second clamp element 86 and a second variation shoulder portion 18c, all of which are the same in configuration, construction and operation as their counterparts used to hold the first variant cutter 14d.

There is shown in the drawings at FIGS. 13-16 a third variation 10c of the tool holder 10 shown in FIGS. 1-4. The third variation 10c comprises a head 12c, a primary cutter 14e, a secondary cutter 14f, a primary clamp member 16e and a secondary clamp member 16f.

Figure 13:
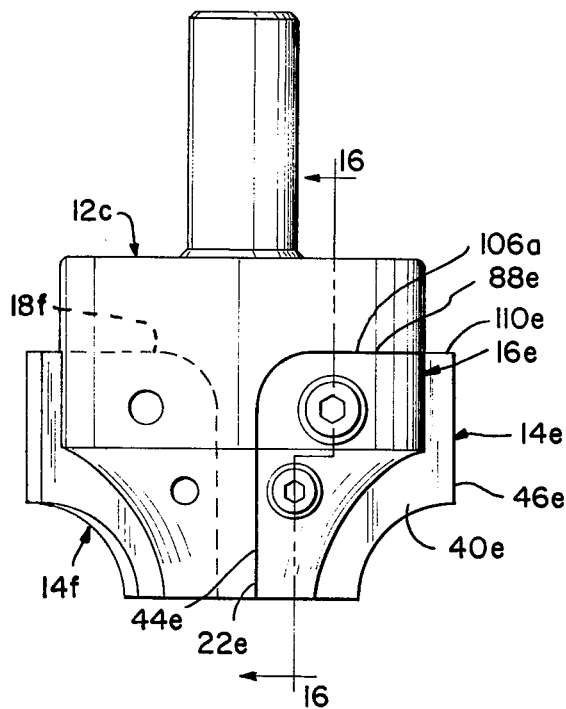
FIG. 13 is a front elevational view of a third variation of the tool holder shown in FIG. 1 utilizing two spaced cutters.
Figure 14:
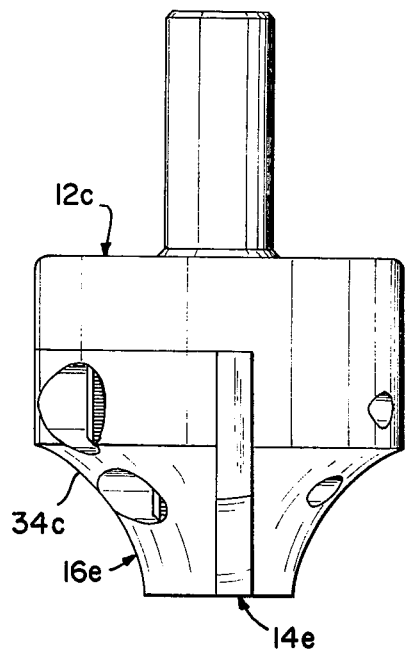
FIG. 14 is a side elevational view of the tool holder shown in FIG. 13.
Figure 15:
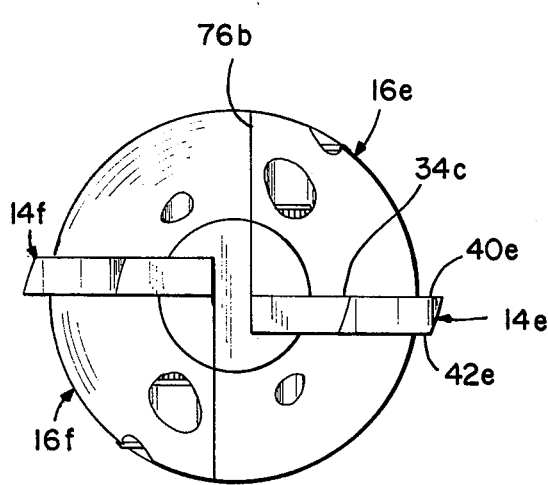
FIG. 15 is a bottom plan view of the tool holder shown in FIG. 13.
Figure 16:
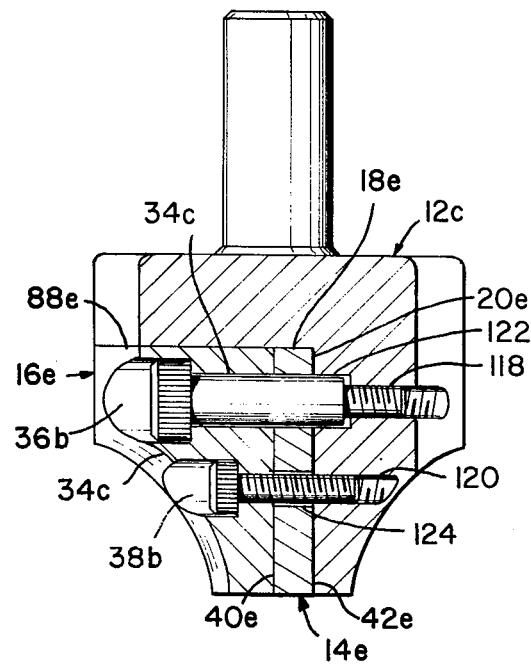
FIG. 16 is a section taken on line 16—16 of FIG. 13.

The head 12c includes a primary shoulder portion 18e formed on one side of the head 12c and a secondary shoulder portion 18f which is formed on the opposite side of the head 12c as indicated in FIG. 13. The primary shoulder portion 18e comprises a planar, horizontal first bed surface 20e and an integral first wall 22e which merges through an arced surface into a first side wall 88e. Both the first wall 22e and the first side wall 88e are in right angle relation to the first bed surface 20e, and the plane of the surface of the first wall 88e forms an obtuse angle with the plane of the surface of the first wall 22e. The external surface of the primary shoulder portion 18e, which includes the first bed surface 20e, defines a quarter of a truncated cone. The first bed surface 20e has an internally threaded and shouldered primary hole 118 formed vertically therethrough. The primary hole 118 is formed proximate the first side wall 88e. An internally threaded secondary hole 120 is formed vertically through the first bed surface 20e and is of smaller diameter than the secondary hole 118.

The primary cutter 14e has a body portion including a first flat 40e and a second flat 42e in parallel relation to the first flat 40e. The primary cutter 14e has an edge wall 44e in right angle relation to and joining the first and second flats 40e, 42e, at a side of the body portion.

The edge wall 44e merges into a side edge wall 110e through an arced portion and is in right angle relation with a formed wall which has a cutting edge 46e formed in a portion thereof. The cutting edge 46e is arced on a horizontal plane, is spaced from the edge wall 44e, is slightly convex on a plane transverse to the horizontal planes of the first and second flats 40e, 42e, and is biased inwardly from the first flat 40e to the second flat 42e.

A primary opening 122 is formed transversely through the primary cutter 14e from the first flat 40e to through the second flat 42e. A secondary opening 124 is formed transversely through the primary cutter 14e having its vertical axis in spaced, parallel relation to the vertical axis of the primary opening 122. The primary opening 122 is located closer to the side edge wall 110e than the secondary opening 124.

The primary clamp member 16e has the external configuration of ¼ section of a truncated cone and comprises a body portion having a substantially planar face 34c, is in integral, right angle relation with a rear wall 76b and a side wall 106a. The rear wall 76b merges into the side wall 106a through an arced corner portion and is in angular relation with the plane of the side wall 106a. An internally shouldered first hole 36b is formed through the planar face 34c of the primary clamp member 16e proximate the side wall 106a. A through second hole 38b is formed in the face 34c, spaced from the first hole 36b and more remote from the side wall 106a than the first hole 36b.

The third variation tool holder 10c is assembled by positioning the second flat 42e of the primary cutter 14e in superposed, abutting relation to the first bed surface 20e of the primary shoulder portion 18e, locating the edge wall 44e in abutting relation to the first wall 22e, the side edge wall 110e in abutting relation to the side wall 88e, the primary opening 122 in coaxial alignment with the primary hole 118 and the secondary opening 124 in axial alignment with the secondary hole 120. The cutting edge 46e will therefore extend beyond the area defined by primary shoulder portion 18e since the primary cutter 14e is wider than the primary shoulder portion 18e. The primary clamp member 16e is then placed in superposed relation to the primary cutter 14e with the planar face 34c abutting the first flat 40e, the rear wall 76b bearing against the first wall 22e, the side wall 106a bearing against the side wall 88e, the first hole 36b in axial alignment with the primary opening 122 and the second hole 38b in axial alignment with the secondary opening 124. A first screw 52c, having a head and a shouldered shank including an upper unthreaded portion and a lower threaded portion, is passed through the first hole 36b of the primary clamp member 16e, then through the primary opening 122 of the primary cutter 14e and is screwed into engagement with the internal threads of the primary hole 118 formed in the first bed surface 20e with the upper unthreaded portion of the first screw 52c in slip engagement with a portion of the primary hole 118. When securely screwed in position the shoulder of the first screw 52c is in spaced superposed relation to the internal shoulder of the primary hole 118. A headed second screw 52d is passed through the second hole 38b of the primary clamp member 16e, then through the secondary opening of the primary cutter 14e and is screwed into engagement with the internal threads of the secondary hole 120 formed in the first bed surface 20e. The primary cutter 14e is thus sandwiched between the first bed surface 20e and the primary clamp member 16e and fixed in position.

The secondary shoulder portion 18f, secondary cutter 14f and secondary clamp member 16f are all similar in configuration and construction as the primary shoulder portion 18e, the primary cutter 14e and the primary clamp member 16e respectively and are similarly fastened together as their counterparts.

There is shown in the drawings at FIGS. 17–20 a fourth variation 10d of the tool holder 10 shown in FIGS. 1–4. The fourth variation 10d comprises a head 12d, a primary cutter 14g, a secondary cutter 14h, a primary clamp member 16g, and a secondary clamp member 16h.

Figure 19:
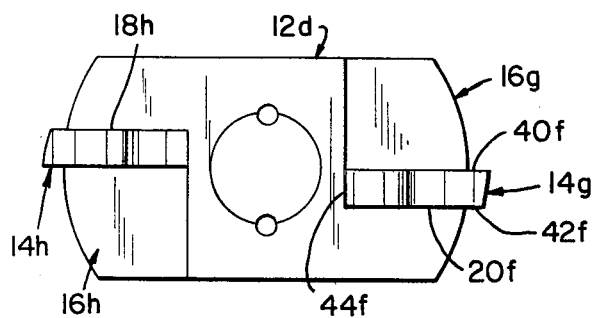
FIG. 19 is a bottom plan view of the tool holder shown in FIG. 17.

The head 12d includes a primary shoulder portion 18g and a secondary shoulder portion 18h which is formed on the opposite side of the head 12d as indicated in FIG. 19. The primary shoulder portion 18g comprises a planar, horizontal first bed surface 20f and an integral first wall 22f extending vertically from the first bed surface 20f in right angle relation thereto. An internally tapped and shouldered through aperture 126 is formed in the central portion of the first bed surface 20f.

Figure 17:
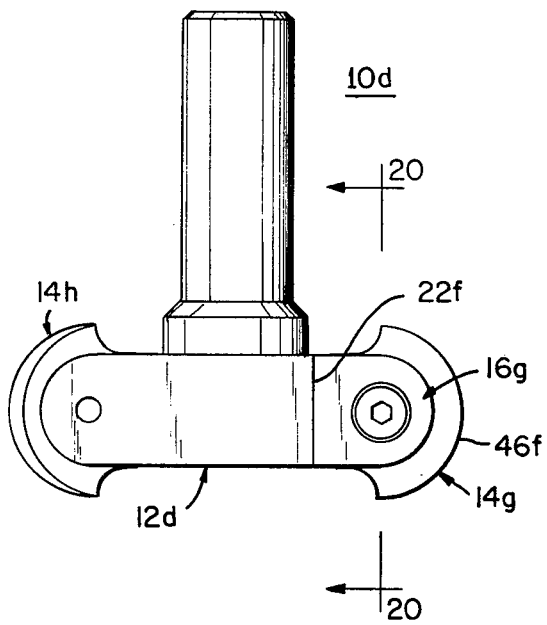
FIG. 17 is a front elevational view of a fourth variation of the tool holder shown in FIG. 1 utilizing two spaced cutters.
Figure 18:
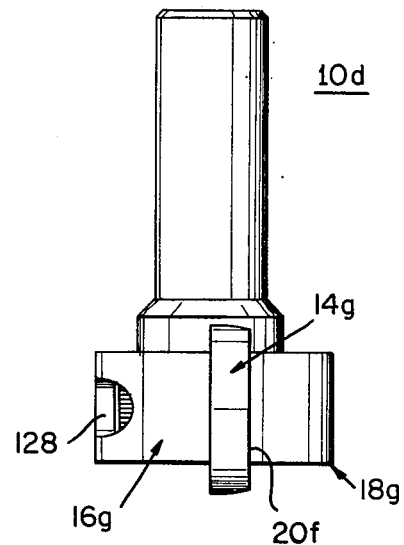
FIG. 18 is a side elevational view of the tool holder shown in FIG. 17.

The primary cutter 14g is generally semi-circular in its plan view configuration and includes a base having a horizontal first flat 40f and a second flat 42f. The second flat 42f is in spaced parallel relation to the first flat 40f. An edge wall 44f is in right angle relation to and joins the first and second flats 40f, 42f at a side of the base. The cutting edge 46f is semi-circular and extends from one terminal end of the edge wall 44f to the other as shown in FIG. 17. The cutting edge 46 is slightly convex in transverse relation to the horizontal plane of the base of the primary cutter 14g and is angled inwardly from the first flat 40f to the second flat 42f. An opening 50a is centrally formed through the base and the first and second flats 40f, 42f.

The primary clamp member 16g comprises a body portion having a planar face 34d and an end wall 35a in right angle relation to the face 34d. A vertical, internally shouldered hole 128 is formed from through the upper surface of the primary clamp member 16g to through the face 34d.

A secondary shoulder portion 18h is similar in configuration and construction to the primary shoulder portion 18g and the secondary cutter 14h and the secondary clamp member 16h are similar in configuration and contruction to their respective counterparts, the primary cutter 14g and the primary clamp member 16g.

Figure 20:
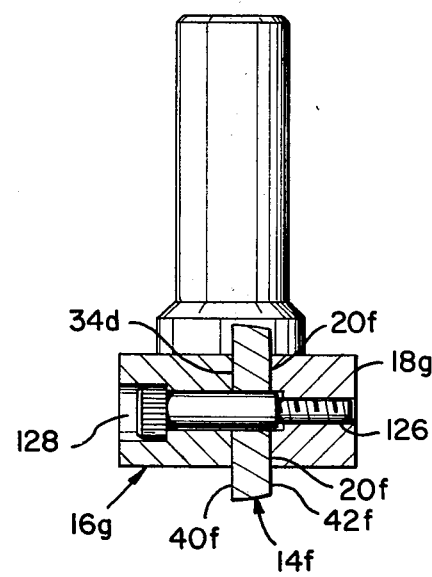
FIG. 20 is a section taken on line 20—20 of FIG. 17.

The fourth variation 10d tool holder is assembled by positioning the second flat 42f of the primary cutter 14g is superposed, abutting relation to the primary shoulder portion 18g, locating the edge wall 44f in bearing relation to the first wall 22f and placing the opening 50a in coaxial alighnment with the aperture 126. The cutting edge 46f of the primary cutter 14g extends beyond the area defined by the primary shoulder portion 18g because its width is greater than the width of the first bed surface 20f. The face 34d of the primary clamp member 16g is then positioned in superposed, abutting relation to the first flat 40f of the primary cutter 14g with the end wall 35a bearing against the first wall 22f and the hole 128 axially aligned with the opening 50a of the primary cutter 14g. A first screw 52e having a head and a shouldered shank, including an upper unthreaded portion and a lower threaded portion, is passed through hole 128 in the primary clamp member 16g then through the opening 50a of the primary cutter 14g and is then threaded into engagement with the internal threads of the aperture 126 with the shoulder of the first screw 52e in proximate spaced relation to the internal shoulder of the aperture 126 and the upper unthreaded portion of the first screw 52e is slip engaged with a portion of the aperture 126 as shown in FIG. 20. The secondar cuttery 14g, the secondary clamp member 16h and the secondary shoulder portion 18h are assembled in the same manner and by similar means as that set forth hereinbefore for the primary cutter 14g, the primary clamp member 16g and the primary shoulder portion 18g. In the final assembly, the cutting edges of the cutters 14g, 14h face in opposite directions away from each other.

The first variation 10a, second variation 10b, third variation 10c and fourth variation 10d all have heads which include cylindrical engagement portions, similar to the engagement portion 26, that are adapted to be held by a milling machine (not shown).

The engagement relation between the unthreaded shank of the first screw, the opening in the cutter, and the aperture in the bed or banking surface of the shoulder portion is very important assuring that the cutter will be positioned in the same relation to the banking surface of the shoulder portion each time they are assembled together.

The clamping of the cutter, for most of the embodiments, is effected by the head of the first screw bearing against the clamping member.

It should be noted in regard the variation disclosed in FIGS. 17–20 that when securely engaged in position, the shoulder of the first screw 52e is in spaced, superposed relation to the internal shoulder of the aperture 126.

What I claim is:

1. A tool holder for use with a machine tool, the holder comprising a head, a cutter, a clamp member and a first screw, the head including a first shoulder portion, the first shoulder portion having bed surface, the cutter having a first flat, a second flat, a cutting edge, and a first opening formed through the first and second flats, the first and second flats in spaced parallel relation to each other, a first aperture formed through the bed surface, the aperture having an internal shoulder, an upper portion and a lower portion, the upper and lower portions separated by the internal shoulder, the lower portion being tapped, the first screw having a head and shank, the shank including an external shoulder, a top portion and a threaded bottom portion, the external shoulder positioned between the top portion and bottom portion, the clamp member having a face and a first hole formed therethrough, the second flat of the cutter in superposed relation to the bed surface, the first opening of the cutter in axial alignment with the first aperture formed in the bed surface, the face of the clamp member in superposed relation to the first flat of the cutter and the first hole of the clamp member in axial alignment with the first opening in the cutter, the head of the screw in superposed, abutting relation with the clamp member adjacent the hole thereof and the shank of the screw positioned within the first hole of the clamp member, the first opening of the cutter and the first aperture of the first shoulder portion with the top portion of the shank slip engaged with the upper portion of the aperture, the bottom portion of the shank threaded into the lower portion of the first aperture and the external shoulder of the shank in superposed relation to the internal shoulder of the first aperture.

2. A tool holder as set forth in claim 1 further comprising a shelf portion, the shelf portion having an upper surface and being integral with and extending from the bed surface, the cutter having an edge wall, the edge wall bearing against the shelf portion.

3. A tool holder as set forth in claim 2 wherein the shelf portion having a single, tapped aperture formed therein and the clamp member having a second hole formed therethrough spaced from the first hole, and further comprising a second screw, having a head and a shank, the single aperture and the second hole axially aligned and the head of the second screw in abutting relation with the clamp member and the shank of the second screw passed through the second hole of the clamp member and threaded into the single aperture of the shelf portion.

4. A tool holder as set forth in claim 1 further comprising a second screw, the first shoulder portion having a first wall, the first wall extending in angular relation to the bed surface, the cutter having an edge wall, and a second opening formed through the first and second flats, the cutting edge spaced from the edge wall, the bed surface having a second aperture formed therethrough, the second aperture spaced from the first aperture and having an internal first shoulder, a first upper portion and a tapped first lower portion, the internal shoulder positioned between the first upper and first lower portions, the clamp member having a second hole, the second hole formed through the clamp member and the face thereof and spaced from the first hole, the second opening of the cutter in axial alignment with the second aperture of the first shoulder portion, the second hole of the clamp member in axial alignment with the second opening of the cutter, the second screw having a first head and first shank, the first shank including a first external shoulder, a smooth first top portion and a threaded first bottom portion, the first external shoulder positioned between the first top portion and the first bottom portion, the first head of the second screw being in superposed abutting relation to the clamp member adjacent the second hole and portions of the first shank of the second screw positioned within the second hole of the clamp member and the second opening of the cutter and the second aperture of the first shoulder portion with the first top portion of the first shank slip engaged with the first upper portion of the second aperture, the first bottom portion of the first shank threaded into the first lower portion of the second aperture and the first external shoulder of the first shank in superposed relation to the first internal shoulder of the second aperture.

5. A tool holder as set forth in claim 1 further comprising a first clamp element, the first shoulder portion including a first wall and a first side wall, both the first wall and the first side wall extending in integral angular relation to the bed surface and in integral angular relation to each other, a slot formed through the first side wall, the slot having a floor portion, the floor portion having a horizontal plane and having an internally threaded channel formed in right angle relation therethrough, the horizontal plane of the floor portion spaced from and parallel with the bed surface, the first clamp element having an upper surface and a lower surface and having a first passage formed therethrough from through the upper surface to through the lower surface, the first passage having an internal shoulder, the clamp having a side wall in integral angular relation to the face, the side wall of the clamp member having a notch formed therein, the notch of the clamp member facing the slot of the first shoulder portion, the first clamp element positioned in the slot and the notch, having its lower surface in superposed abutting relation with the first flat of the cutter and in superposed abutting relation with the floor portion of the slot and the first passage in axially alignment with the channel of the floor portion, an engagement screw having a head and a threaded shank, the engagement screw positioned within the first passage and threaded into the channel with the head of the engagement screw bearing against the internal shoulder of the first passage.

6. A tool holder as set forth in claim 5 wherein the first clamp element includes a second passage formed from through the upper surface to through the lower surface, the second passage having an internal shoulder, internal threading and being spaced from the first passage, the floor portion of the slot having a guide hole formed therein, a guide screw having a head and threaded shank, the second passage in axial alignment with the guide hole and the guide screw positioned within the second passage and the guide hole having its head bearing against the internal shoulder of the second passage and threaded into engagement with the second passage.

7. A tool holder for use with a machine tool as set forth in claim 1 further comprising a second shoulder portion formed in the head, having a primary bed surface and spaced from the first shoulder portion, a second cutter, a second clamp member and second screw, the second cutter having a primary flat, a secondary flat, a primary cutting edge and a primary opening, the primary opening formed through the primary flat and the secondary flat, the primary flat and the secondary flat in spaced, parallel relation to each other, a primary aperture formed through the primary bed surface, the primary aperture having a first internal shoulder, a first upper portion and a first lower portion, the first upper and first lower portions separated by the first internal shoulder, the first lower portion being tapped, the second screw having a firt head and first shank, the first shank including a primary external shoulder, a first top portion and a threaded first bottom portion, the primary external shoulder positioned between the first top portion and the first bottom portion, the second clamp member having a primary face and a primary hole formed therethrough, the secondary flat of the second cutter in superposed relation to the primary bed surface, the primary opening of the second cutter in axial alignment with the primary aperture formed in the primary bed surface, the primary face of the second clamp member in superposed relation to the primary flat of the second cutter and the primary hole of the second clamp member in axial alignment with the primary opening in the second cutter, the first head of the second screw in superposed, abutting relation with the second clamp member adjacent the primary hole thereof and the first shank of the second screw positioned within the primary hole of the clamp member, the primary opening of the second cutter and the primary aperture of the second shoulder portion with the first top portion of the first shank slip engaged with the first upper portion of the primary aperture, the first bottom portion of the first shank threaded into the first lower portion of the first aperture and the first external shoulder of the first shank in superposed relation to the first internal shoulder of the first aperture, the cutting edge of the cutter facing in the opposite direction to that of the primary cutting edge of the second cutter.

\* \* \* \* \*